United States Patent
Lane et al.

(10) Patent No.: US 6,929,852 B2
(45) Date of Patent: Aug. 16, 2005

(54) PROTECTIVE OVERLAYER FOR CERAMICS

(75) Inventors: Jay Edgar Lane, Murrysville, PA (US); Gary Brian Merrill, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 10/214,784

(22) Filed: Aug. 8, 2002

(65) Prior Publication Data

US 2004/0028941 A1 Feb. 12, 2004

(51) Int. Cl.[7] ............................................. B32B 9/04
(52) U.S. Cl. .................... 428/304.4; 428/697; 428/701; 428/702; 428/699; 428/323
(58) Field of Search .............................. 428/469, 697, 428/698, 701, 702, 699, 323, 304.4

(56) References Cited

U.S. PATENT DOCUMENTS

| | | |
|---|---|---|
| 5,045,345 A | 9/1991 | Singer |
| 5,332,619 A | 7/1994 | Lacoste et al. |
| 5,391,404 A | 2/1995 | Lee et al. |
| 5,514,474 A | 5/1996 | Morgan et al. |
| 5,665,463 A | 9/1997 | Morgan et al. |
| 5,759,632 A | 6/1998 | Boakye et al. |
| 5,858,465 A | 1/1999 | Hunt et al. |
| 5,948,516 A | 9/1999 | Kriven et al. |
| 5,962,076 A * | 10/1999 | Mason et al. |
| 5,985,470 A | 11/1999 | Spitsberg et al. |
| 6,013,592 A * | 1/2000 | Merrill et al. ............ 501/80 |
| 6,036,762 A | 3/2000 | Sambasivan |
| 6,060,177 A | 5/2000 | Bornstein et al. |
| 6,165,600 A * | 12/2000 | Ivkovich et al. |
| 6,197,424 B1 * | 3/2001 | Morrison et al. |
| 6,299,988 B1 * | 10/2001 | Wang et al. |
| 6,465,090 B1 * | 10/2002 | Stowell et al. |
| 6,485,848 B1 * | 11/2002 | Wang et al. ............ 428/697 |
| 6,558,814 B2 * | 5/2003 | Spitsberg et al. |
| 6,733,908 B1 * | 5/2004 | Lee et al. .............. 428/702 |

FOREIGN PATENT DOCUMENTS

EP 1 142 852 A2 10/2001

* cited by examiner

*Primary Examiner*—Jennifer McNeil

(57) ABSTRACT

An alumina comprising composition protective overlayer (20) for protecting a ceramic matrix composite material (12) from a high temperature, moisture-containing environment. Alumina may be used as a protective overlayer to protect an underlying mullite layer to temperatures in excess of 1,500° C. The coating may have porosity of greater than 15% for improved thermal shock protection. To prevent the ingress of oxygen to an underlying ceramic material, an oxide barrier layer may be optionally disposed between the alumina coating and the ceramic material. Such a protective overlayer may be used for an article having a ceramic oxide or non-oxide substrate.

13 Claims, 1 Drawing Sheet

PROTECTIVE OVERLAYER FOR CERAMICS

FIELD OF THE INVENTION

This invention relates generally to the field of materials, and more specifically to the field of ceramics, and in particular application, to an article comprising an alumina overlayer disposed on a ceramic oxide insulating material that is disposed on a ceramic matrix composite substrate component of a gas turbine engine and having an optional oxide bond layer disposed between the ceramic matrix composite substrate and overlayer.

BACKGROUND OF THE INVENTION

Components of gas turbine engines are exposed to very high temperature, high pressure combustion gasses containing moisture, oxygen and other corrosive compounds. Modern gas turbine engines may have firing temperatures that exceed 1,400° C., and temperatures of 1,500–1,600° C. are expected as the demand for even more efficient engines continues. Cobalt and nickel base superalloys are used to form many gas turbine components, but even these superalloy materials must be aggressively cooled and/or insulated from the hot gas flow in order to survive long term operation in the combustion environment.

Ceramic matrix composite (CMC) materials have many potential applications in high temperature environments due to their ability to withstand and operate at temperatures in excess of those allowed for a non-insulated superalloy part. However, oxide and non-oxide CMC's can survive temperatures in excess of 1,200° C. for only limited time periods in a combustion environment. Furthermore, oxide-based CMC's cannot be cooled effectively with active cooling systems due to their low thermal conductivity and their limitations in cooling fluid path design due to manufacturing constraints. Non-oxide based CMCs can be aggressively cooled to withstand temperatures above 1200° C., but they are subject to environmental degradation that limits their useful life. To increase the operating temperature range and useful life for CMC materials, a high temperature insulation for a ceramic matrix composite material is described in U.S. Pat. No. 6,013,592.

Current structural ceramic technology for gas turbine engines relies on silica-based materials. Silica-based non-oxides such as silicon carbide (SiC) and silicon nitride ($Si_3N_4$) are subject to both oxidation and attack by high temperature, high pressure water vapor. In this dual degradation mechanism, the silicon carbide or silicon nitride is oxidized to form a thermally grown oxide ($SiO_2$) layer. This oxide layer then reacts with the high temperature, high pressure water vapor to form a volatile hydroxide species [$Si(OH)_x$] which is then lost to the environment. Thus, surface recession occurs in a continual process as the protective $SiO_2$ layer volatizes and the base ceramic oxidizes to replenish the lost $SiO_2$. This process is enhanced by the high velocity gas stream in a gas turbine environment. Accordingly, environmental barrier coatings (EBC) have been developed to protect silica-based non-oxide ceramics from the combustion environment. U.S. Pat. No. 5,391,404 describes a process for coating a silica-based ceramic with mullite, and U.S. Pat. No. 5,985,470 describes a barium strontium aluminosilicate (BSAS) bond coat underlying a thermally insulating top coat over a silicon carbide containing substrate. These EBC's typically function at a maximum surface temperature of 1,200–1,300° C. Since growth of a silicon dioxide layer underneath the environmental barrier coating could result in spalling of the coating and loss of environmental protection, the environmental barrier coating material must be sufficiently dense to prevent the ingress of oxygen through the coating, for example having only closed porosity of no more than approximately 10%.

The composite structure described in U.S. Pat. No. 6,013,592 utilizes a thick mullite-based thermal barrier coating over a ceramic matrix composite substrate material. Oxide ceramics such as mullite ($3Al_2O_3$-$2SiO_2$) are not subject to oxidation, but they are degraded by the effects of high temperature water vapor, albeit at a slower rate than non-oxide ceramics. The rate of silica loss and subsequent recession of an oxide ceramic material will increase with an increasing temperature and flow velocity, and mullite may not perform adequately in certain gas turbine applications where flow rates are high and temperatures may be in the range of 1,500–1,600° C.

SUMMARY OF THE INVENTION

Accordingly, improved materials are needed for use in advanced combustion turbine engines where firing temperatures may be in the range of 1,500–1,600° C.

An article is also described as having a ceramic matrix composite substrate; a layer of ceramic oxide insulating material disposed on the ceramic matrix composite substrate; and a layer of an alumina comprising composition disposed on the insulating material. The article may also optionally incorporate an oxide bond layer disposed between the ceramic matrix composite substrate and insulating material. The alumina comprising composition may be alumina, the ceramic oxide insulating material may be mullite or an alumina/mullite mixture; the ceramic matrix composite substrate may be those described in U.S. Pat. No. 6,013,592, and may further include silicon; and an optional oxide bond layer comprised of one or more of the group of mullite, alumina, and zirconia. Also, the alumina comprising composition may have a porosity of at least 10% or at least 15%, and a thickness of greater than 0.1 mm.

In another embodiment, an article is described herein as including a non-oxide ceramic substrate; an oxygen barrier layer disposed on the non-oxide ceramic substrate; a ceramic oxide insulating layer disposed on the the non-oxide ceramic substrate; and a layer of an alumina comprising composition disposed on the oxygen barrier layer. The article may also optionally incorporate an optional oxygen bond layer. The alumina comprising composition may be alumina; the ceramic oxide insulating layer may be mullite or a mullite/alumina mixture; the non-oxide ceramic substrate may be one of the group of silicon carbide and silicon nitride; and the optional oxygen barrier layer may be one of the group of mullite, zircon, zirconium phosphate, and yttrium silicate. The alumina comprising composition may have a porosity of at least 10% or at least 15%, and a thickness of greater than 0.1 mm.

An article is also described herein as including a ceramic oxide substrate; and an alumina comprising composition disposed on the ceramic oxide substrate. The alumina comprising composition may be alumina, and the ceramic oxide substrate may be mullite or an alumina-mullite mixture, and may further include silicon. The alumina comprising composition may have a porosity of at least 10% or at least 15%, and a thickness of greater than 0.1 mm. The article may also optionally incorporate an oxide bond layer.

BRIEF DESCRIPTION OF THE DRAWINGS

These and other advantages of the invention will be more apparent from the following description in view of the drawings that include.

DETAILED DESCRIPTION OF THE INVENTION

An alumina comprising composition may be used as a protective overlayer coating material for ceramics and ceramic matrix composite materials with thermal insulation layers. Alumina comprising compositions include compositions comprising alumina, for example alumina ($AlO_2$), yttrium aluminum garnet (YAG), rare earth aluminates such as $CeAlO_3$ and the like. In one particular application, alumina powder commercially available from the Sulzer Metco company located in New York may be used as a protective overlayer for mullite and mullite containing ceramics. Alumina is stable up to its melting point, has excellent resistance to water vapor degradation in gas turbine environments, and it is chemically compatible with many different oxides even at 1,800° C., including mullite, alumina, yttrium aluminum garnet (YAG) and zirconia ($ZrO_2$).

Each of the alumina comprising compositions is a candidate as a protective overlayer for mullite even though a coefficient of thermal expansion mismatch may exist between the mullite and the alumina comprising compositions. Alumina has been successfully plasma sprayed and slurry coated onto the thermal insulation material. The likelihood of spallation is appreciably decreased by controlling the alumina layer thickness.

Figure 1:
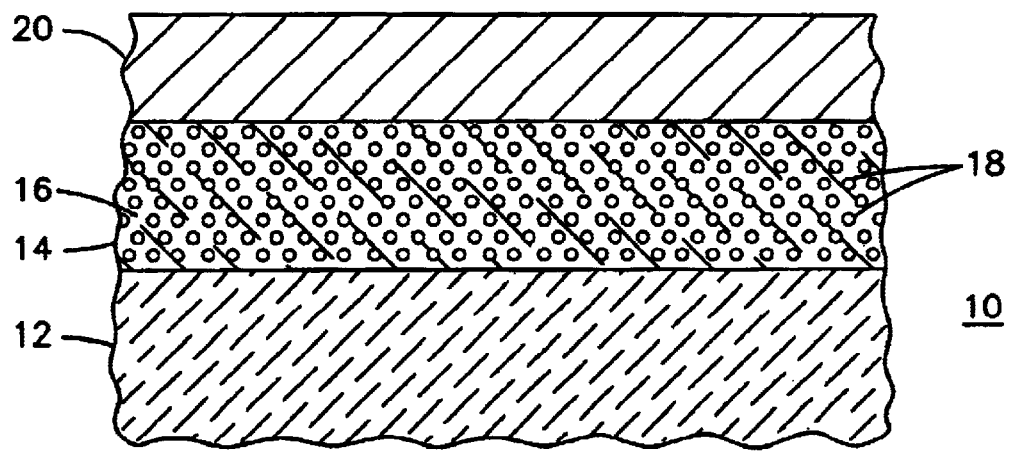
FIG. 1 is a partial cross-sectional view of a component formed of an oxide ceramic matrix composite substrate material covered with a ceramic oxide insulating material, which in turn is protected by an alumina coating.

FIG. 1 is a partial cross-sectional view of a component 10 of a gas turbine engine. The component 10 is formed of a substrate 12 of a ceramic matrix composite material that is thermally protected by a ceramic insulating coating 14. The ceramic matrix composite substrate 12 and ceramic insulating coating 14 may be of the type described in U.S. Pat. No. 6,013,592, incorporated by reference herein. Ceramic insulating coating 14 is advantageously an oxide based ceramic including a matrix material 16 surrounding a plurality of mullite spheres 18. The matrix material 16 may include a mullite filler powder and a phosphate binder or an alumina filler powder and an alumina binder. One or more optional oxide bond layers (not shown) may be disposed between the ceramic matrix composite substrate 12 and the ceramic insulating coating 14 and may comprise one or more of the group of mullite, alumina, and zirconia. An optional oxygen barrier layer 34, illustrated in FIG. 2, may also be used.

The mullite-based ceramic insulating coating 14 would be susceptible to silica loss and/or recession if it were exposed to very high temperature and atmospheric or high pressure water vapor, such as in the range of 1,500–1,600° C. Accordingly, a protective overlayer 20 is disposed over the ceramic insulating coating 14 to isolate the ceramic insulating coating 14 from water vapor contained in the hot gas environment in which component 10 is designed to operate. The protective overlayer 20 is an alumina comprising composition such as alumina applied by any known deposition process, such as slurry coating, sol-gel, chemical vapor deposition, physical vapor deposition or plasma spray. Protective overlayer 20 may advantageously be applied to a thickness of greater than 0.1 mm (100 microns), for example, to a thickness of 0.1–0.5 mm, or greater than 0.1 mm up to 0.5 mm, or between 0.15–0.5 mm, or between 0.25–0.5 mm. Such thickness is possible because of the close match between the coefficients of thermal expansion between the protective overlayer 22 and the underlying layer 14. Typical prior art environmental barrier coatings may be limited to a thickness of about 0.1 mm due to differential thermal expansion concerns. The protective overlayer 22 may be formed to have a porosity of greater than 10%, or preferably greater than 15%, in order to provide the material with an improved resistance to thermal shock loadings.

In one test specimen, a layer 20 of alumina was applied as a slurry coat and was fired at 1,400° C. The slurry consisted of a fine alumina powder (having an average particle size of less than 5 microns) mixed with an alumina forming binder solution such as aluminum oxy chloride or aluminum hydroxyl chloride. The thickness of the coating was relatively uniform at about 200 microns. In another test specimen, a layer 20 of alumina was applied to a substrate 12 preheated to a minimum surface temperature of 750° F. by an air plasma spray of alumina particles generally smaller than conventional plasma-sprayed alumina particles (having an average particle size of less than 75 microns). The thickness of the coating was relatively uniform at about 300 microns. Despite the high temperatures, the coatings showed no evidence of surface cracking, which can be attributed to a good match between the coefficients of thermal expansion of the alumina coating 20 and the underlying mullite-based insulation layer 14 for this coating thickness. Microcracking was present within the coating 20, which may give the coating 20 added strain tolerance. There was no evidence of reaction between the mullite and the alumina.

An exposure test was conducted on alumina coated mullite specimens. The test specimens were cylinders having an inner diameter of about 20 mm, outer diameter of about 30 mm, and length of about 30 mm and having alumina coatings of about 200–300 microns on the inner surface. The test environment was limited to pressures of 200 psig in a natural gas fired combustor test rig with 10% water vapor and a flow rate of about 0.3 Mach. The test was conducted for about 430 hours at temperatures ranging from 1,450–1,810° C. Non alumina coated mullite specimens were also tested in this same environment and showed silica loss, which demonstrates the aggressiveness of the exposure conditions. This silica loss weakens the surface and can lead to recession and continued degradation of the thermal insulation surface shortening the life of the material in a gas turbine application. By contrast, the alumina coated mullite specimens showed good resistance to the environment; the alumina coating prevented loss of silica from the thermal insulation coated specimens.

A 100-hour rig test simulating the combustion environment in a Centuar 50 or Taurus 60 engine was also conducted on a sub-scale hybrid combustion liner specimen made in accordance with the above teachings of a ceramic matrix composite substrate with a layer of ceramic oxide insulating material and alumina overlayer. The test was conducted in two parts: Part I, steady state for 50 hours, and Part II, 50 thermal cycles for a total of 50 hours. The liner was tested in a high-pressure rig using a production T60 SoloNOx gas-only fuel injector. The test conditions for steady state were: simulated load at 100%, inlet pressure at 150 psig, inlet air temperature at 690° F., air flow at 4.0 pps, and injector flow function at 0.37. The liner was instrumented with 5 type S and 10 type K thermocouples located in three, 120-degree circumferential positions. At each location, the ceramic insulating material surface, ceramic insulating material/ceramic matrix composite liner interface, and ceramic matrix composite liner surface temperatures were recorded to measure the thermal gradient across the liner. The test rig was started on natural gas and brought up to the full load. An air to fuel ratio (AFR) of 59 was maintained for the steady state condition. This AFR gave a flame temperature of approximately 3400° F. The hot wall temperatures were in the 2100° F. to 2200° F. range at the start of the test. After several hours of running, some of the thermocouples were lost and others were detached from the surface of the hybrid liner, indicating lower temperatures. The test was stopped after 8 hours and 50 hours of steady state operation to allow visual inspection of the liner. At both times, the liner appeared to be in an excellent condition with no apparent damage. Thermal cycling of the liner was started after the second inspection. A total of 50 one-hour cycles were run by doing a soft shut down for a period of five minutes, followed by relighting the combustor and bringing it back to full temperature at an AFR of 59. The liner survived the 100-hour high-pressure rig test without any major damage. No combustor oscillations were seen throughout the test and leakage was controlled to 5%. There were no signs of microcracks on the ceramic insulating material surface, and also no apparent indication of delaminations in the ceramic matrix composite material. Thermocouple data from the 100-hour test indicated large temperature gradients across the liner, approximately 400° F. to 600° F., lower than what was expected.

Although FIG. 1 shows the overlayer 20/insulating coating 14 interface being substantially smooth, the interface can be roughened or the insulating coating 14 can be adapted to provide surface features that further secure the overlayer 20 to the insulating coating 14. For example, the top surface of the insulating coating 14 can be machine ground to remove a portion of the hollow mullite spheres 18 located at the interface, thereby exposing the interior walls of the hollow spheres 18 to the interface. Thus, when the overlayer 20 is deposited onto the insulating coating 14, the overlayer 20 can fill the hollow interior walls to provide a mechanical interlock or anchor with the insulating coating 14. This exemplary surface feature method is particularly effective with APS or slurry spray coatings, PVD coatings, and viscous slurry coatings applied by brushing or dipping.

In another deposition method (not shown), if the insulating coating 14 is cast to shape, the overlayer 20 can be formed in situ during the insulating coating 14 deposition. For example, a mesh fugitive sized to allow the matrix material 16 to penetrate but not to allow the spheres 18 to penetrate can be used on the mold surface. The casting will thus result in the matrix material 16 being predominately exposed at the overlayer 20/insulating coating 14 interface. Use of a matrix material 16 rich in alumina comprising overlayer 20 composition thereby provides in situ formation of the overlayer 20.

Figure 2:
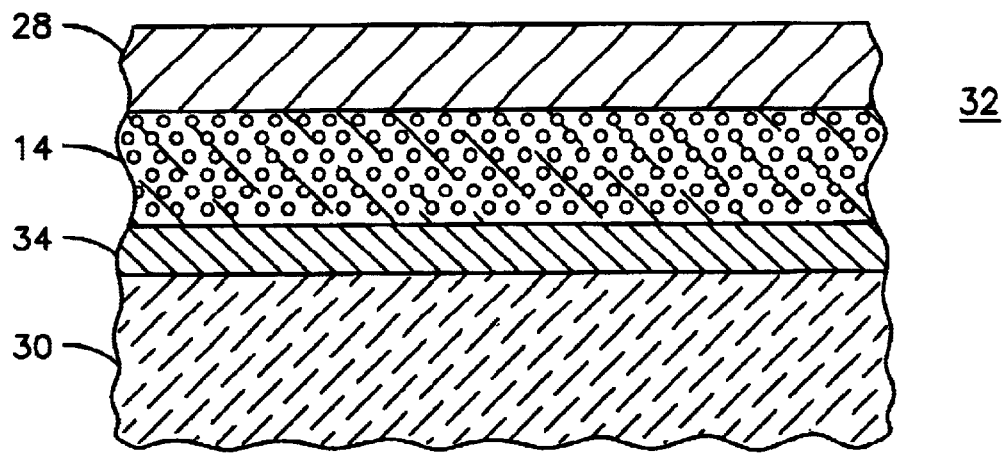
FIG. 2 is a partial cross-sectional view of a non-oxide ceramic substrate material covered with a ceramic oxide insulating material protected by an alumina coating, and with an oxygen barrier layer disposed between the non-oxide substrate and the insulating layer.

FIG. 2 illustrates the use of a layer of the alumina comprising composition 28 described above as a protective overlayer coating for a non-oxide ceramic substrate 30 such as silicon carbide or silicon nitride, upon which the ceramic insulating coating 14 is disposed, to form an article 32. In this embodiment, the substrate 30 may be vulnerable to oxidation attack, which could result in spalling of any overlying coating. To prevent such oxidation, an optional oxygen barrier layer 34 is disposed between the non-oxide ceramic substrate 30 and the ceramic insulating coating 14. The barrier layer 34 prevents the migration of oxygen from the environment to the underlying substrate 30. The barrier layer 34 should be selected to be chemically and physically compatible with layers 14 and 30 and may be mullite, zircon ($ZrSiO_4$), zirconium phosphate, or yttrium silicate ($Y_2Si_2O_7$), for example. The barrier layer 34 may be deposited by any of the above-described deposition methods and may have a thickness of 10–100 microns. The barrier layer is particularly advantageous to inhibit surface recession due to active oxidation in the presence of water vapor when the ceramic insulating coating 14 is less than 0.5 mm, and to inhibit internal oxidation when the ceramic insulating coating 14 is less than 0.3 mm.

One or more optional oxide bond layers (not shown) may also be disposed between the non-oxide ceramic substrate 30 and the ceramic insulating coating 14 and may comprise one or more of the group of mullite, alumina, and zirconia. The optional bond layer tends to be particularly advantageous when used with the non-oxide ceramic substrate 30, since non-oxide ceramic substrates typically have a smaller thermal coefficient of expansion than ceramic matrix composite substrates.

Figure 3:
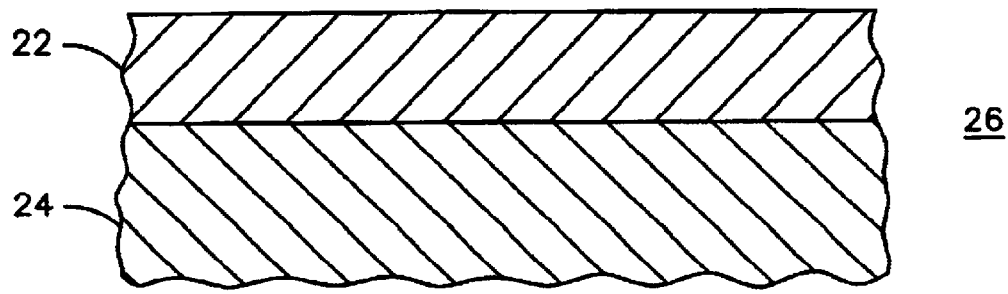
FIG. 3 is a partial cross-sectional view of a refractory ceramic oxide combustor tile substrate protected by a layer of alumina.

FIG. 3 illustrates a layer of an alumina comprising composition 22 such as alumina disposed over a ceramic oxide substrate 24 to form a refractory oxide ceramic combustor tile 26 or gas turbine component such as a blade or vane. The ceramic oxide substrate 24 may be mullite, zircon, or an aluminosilicate, for example. Layer 22 may be deposited by slurry coating, sol-gel, chemical vapor deposition, physical vapor deposition or plasma spray. Like with the embodiment shown in FIG. 1, protective overlayer 22 may advantageously be applied to a thickness of greater than 0.1 mm (100 microns), for example, to a thickness of 0.1–0.5 mm, or greater than 0.1 mm up to 0.5 mm, or between 0.15–0.5 mm, or between 0.25–0.5 mm. Such thickness is possible because of the close match between the coefficients of thermal expansion between the protective overlayer 22 and the underlying layer 24. Typical prior art environmental barrier coatings may be limited to a thickness of about 0.1 mm due to differential thermal expansion concerns. The protective overlayer 22 may be formed to have a porosity of greater than 10%, or preferably greater than 15%, in order to provide the material with an improved resistance to thermal shock loadings. Such porosity is not problematic in this embodiment since the underlying oxide material is not vulnerable to oxidation attack, and is only vulnerable to high velocity water vapor attack. Furthermore, the thickness of layer 22 of greater than 0.1 mm ensures protection against moisture penetration in spite of such porosity, and it provides additional margin against erosion of the protective overlayer 22. The layer of alumina comprising composition 22 acts as a barrier for the underlying ceramic oxide substrate 22 against a high temperature, high flow rate, moisture-bearing operating environment having a temperature exceeding 1,500° C. The layer of alumina comprising composition 22 also acts as a barrier for the underlying ceramic oxide substrate 24 in combustion type applications, such as gas turbines, where degradation of the underlying ceramic oxide substrate 24 would be further enhanced by high gas pressures. One or more optional oxide bond layers (not shown) may be disposed between the ceramic oxide substrate 24 and the alumina comprising composition 22 and may comprise one or more of the group of mullite, alumina, and zirconia. An optional oxygen barrier layer, discussed in more detail in FIG. 2, may also be used.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An article adapted for use in a combustion environment containing moisture, the article comprising:
   an oxide-based ceramic matrix composite substrate;
   a thermal barrier coating of silicon-containing ceramic oxide insulating material disposed on the substrate for protecting the ceramic matrix composite from a high temperature of the combustion environment; and
   a water vapor isolation layer having a porosity of at least 10% consisting essentially of alumina not containing silicon disposed on the layer of insulating material and defining a surface exposed to the combustion environment for protecting the silicon-containing insulating material from water vapor of the combustion environment that would cause silica loss if the insulating material were exposed directly to the combustion environment.

2. The article of claim 1, wherein the water vapor isolation layer consists of alumina.

3. The article of claim 1, further comprising the water vapor isolation layer having a porosity of at least 15%.

4. The article of claim 1, further comprising the water vapor isolation layer having a thickness of greater than 0.07 mm and less than 0.5 mm.

5. The article of claim 1, wherein the ceramic matrix composite substrate comprises an oxide.

6. An article adapted for use in a combustion environment containing moisture, the article comprising:
   an oxide-based ceramic matrix composite substrate;
   a thermal barrier coating of silicon-containing ceramic oxide insulating material disposed on the substrate for protecting the ceramic matrix composite from a high temperature of the combustion environment; and
   a water vapor isolation layer consisting essentially of alumina not containing silicon disposed on the layer of insulating material and defining a surface exposed to the combustion environment for protecting the silicon-containing insulating material from water vapor of the combustion environment that would cause silica loss if the insulating material were exposed directly to the combustion environment,
   wherein the ceramic oxide insulating material comprises a matrix material surrounding a plurality of mullite spheres.

7. The article of claim 6, wherein the matrix material comprises one of a mullite filler powder and a phosphate binder or an alumina filler powder and an alumina binder.

8. An article adapted for use in a combustion environment containing moisture, the article comprising:
   an oxide-based ceramic matrix composite substrate;
   a thermal barrier coating of silicon-containing ceramic oxide insulting material disposed on the substrate for protecting the ceramic matrix composite from a high temperature of the combustion environment; and
   a water vapor isolation layer consisting essentially of alumina not containing silicon disposed on the layer of insulating material and defining a surface exposed to the combustion environment for protecting the silicon-containing insulating material from water vapor of the combustion environment that would cause silica loss if the insulating material were exposed directly to the combustion environment; and
   an oxide bond layer disposed between the ceramic matrix composite substrate and the water vapor isolation layer.

9. An article adapted for use in a combustion environment containing moisture, the article comprising:
   a silicon-containing ceramic oxide insulating material; and
   a water vapor isolation overlayer consisting essentially of alumina not containing silicon having a porosity of at least 10% disposed on the ceramic oxide insulating material and defining a surface exposed to the combustion environment for protecting the silicon-containing insulating material from water vapor of the combustion environment that would cause silica loss if the insulating material were exposed directly to the combustion environment.

10. The article of claim 9, wherein the overlayer consists of alumina.

11. The article of claim 9, further comprising the overlayer having a porosity of at least 15%.

12. The article of claim 9, further comprising the overlayer having thickness of greater than 0.1 mm.

13. The article of claim 9, wherein the ceramic oxide insulating material is selected from the group consisting of mullite, zircon, and an aluminosilicate.

* * * * *